US012177646B2

(12) United States Patent
Popp et al.

(10) Patent No.: US 12,177,646 B2
(45) Date of Patent: Dec. 24, 2024

(54) MAIN-ASSOCIATED AUDIO EXPERIENCE WITH EFFICIENT DUCKING GAIN APPLICATION

(71) Applicant: DOLBY INTERNATIONAL AB, Dublin (IE)

(72) Inventors: Jens Popp, Nuremberg (DE); Claus-Christian Spenger, Nuremberg (DE); Celine Merpillat, Fuerth (DE); Tobias Mueller, Nuremberg (DE); Holger Hoerich, Fuerth (DE)

(73) Assignee: DOLBY INTERNATIONAL AB, Dublin (IE)

( * ) Notice: Subject to any disclaimer, the term of this patent is extended or adjusted under 35 U.S.C. 154(b) by 198 days.

(21) Appl. No.: 17/927,634

(22) PCT Filed: May 20, 2021

(86) PCT No.: PCT/EP2021/063427
§ 371 (c)(1),
(2) Date: Nov. 23, 2022

(87) PCT Pub. No.: WO2021/239562
PCT Pub. Date: Dec. 2, 2021

(65) Prior Publication Data
US 2023/0247382 A1 Aug. 3, 2023

Related U.S. Application Data

(60) Provisional application No. 63/029,920, filed on May 26, 2020.

(30) Foreign Application Priority Data
May 26, 2020 (EP) .................................... 20176543

(51) Int. Cl.
*H04R 5/02* (2006.01)
*G10L 19/008* (2013.01)
(Continued)

(52) U.S. Cl.
CPC ............ *H04S 7/302* (2013.01); *G10L 19/008* (2013.01); *H04S 3/008* (2013.01); *H04S 2400/01* (2013.01);
(Continued)

(58) Field of Classification Search
CPC ...... H04S 7/302; H04S 3/008; H04S 2400/01; H04S 2400/11; H04S 2400/13; G10L 19/008
(Continued)

(56) References Cited

U.S. PATENT DOCUMENTS 8,315,396 B2 11/2012 Schreiner
8,615,088 B2 12/2013 Oh
(Continued)

FOREIGN PATENT DOCUMENTS

EP 3319341 5/2018
EP 3378241 9/2018
(Continued)

OTHER PUBLICATIONS

Hierre, J. et al.“MPEG-H 3D Audio—The New Standard for Coding of Immersive Spatial Audio” IEEE Journal of Selected Topics in Signal Processing, vol. 9, No. Aug. 5, 2015, pp. 770-779.
(Continued)

*Primary Examiner* — Ammar T Hamid

(57) ABSTRACT

An audio bitstream is decoded into audio objects and audio metadata for the audio objects. The audio objects include a specific audio object. The audio metadata specifies frame-level gains that include a first gain and a second gain respectively for a first audio frame and a second audio
(Continued)

frame. It is determined, based on the first and second gains, whether sub-frame gains are to be generated for the specific audio object. If so, a ramp length is determined for a ramp used to generate the sub-frame gains for the specific audio object. The ramp of the ramp length is used to generate the sub-frame gains for the specific audio object. A sound field represented by the audio objects with the sub-frame gains is rendered by audio speakers.

20 Claims, 10 Drawing Sheets

(51) Int. Cl.
*H04S 3/00* (2006.01)
*H04S 7/00* (2006.01)

(52) U.S. Cl.
CPC ....... *H04S 2400/11* (2013.01); *H04S 2400/13* (2013.01)

(58) Field of Classification Search
USPC .................................................. 381/303, 311
See application file for complete search history.

(56) References Cited

U.S. PATENT DOCUMENTS

| | | | |
|---|---|---|---|
| 9,721,575 | B2 | 8/2017 | Dressler |
| 10,251,016 | B2 | 4/2019 | Jot |
| 10,276,173 | B2 | 4/2019 | Baumgarte |
| 2010/0076772 | A1 | 3/2010 | Kim |
| 2014/0023196 | A1 | 1/2014 | Xiang |
| 2014/0025386 | A1 | 1/2014 | Xiang |
| 2016/0157039 | A1 | 6/2016 | Disch |
| 2016/0240204 | A1 | 8/2016 | Kuech |
| 2017/0032793 | A1 | 2/2017 | Baumgarte |
| 2018/0190303 | A1 | 7/2018 | Ghido |
| 2018/0357038 | A1 | 12/2018 | Olivieri |
| 2019/0028827 | A1 | 1/2019 | Ward |
| 2019/0289420 | A1 | 9/2019 | Makinen |

FOREIGN PATENT DOCUMENTS

| | | | | |
|---|---|---|---|---|
| WO | 2008063035 | | 5/2008 | |
| WO | 2013111034 | A2 | 8/2013 | |
| WO | 2015010998 | | 1/2015 | |
| WO | WO-2015006112 | A1 * | 1/2015 | ......... G10L 19/0017 |
| WO | 2015038475 | | 3/2015 | |
| WO | 2019175472 | A1 | 9/2019 | |
| WO | 2020012067 | A1 | 1/2020 | |

OTHER PUBLICATIONS

Riedmiller, J. et al."Delivering Scalable Audio Experiences Using AC-4" IEEE Transactions on Broadcasting, vol. 63, No. 1, Mar. 2017, pp. 179-201.

* cited by examiner

MAIN-ASSOCIATED AUDIO EXPERIENCE WITH EFFICIENT DUCKING GAIN APPLICATION

CROSS-REFERENCE TO RELATED APPLICATIONS

This application claims priority of the following priority applications: U.S. provisional application 63/029,920, filed 26 May 2020 and EP application 20176543.5, filed 26 May 2020, which are hereby incorporated by reference.

TECHNOLOGY

The present invention pertains generally to processing audio signals and pertains more specifically to improving main-associated audio experience with efficient ducking gain application.

BACKGROUND

Multiple audio processors are scattered across an end-to-end audio processing chain to deliver audio content to end user devices. Different audio processors may perform different, similar and/or even repeated media processing operations. Some of these operations may be prone to introducing audible artifacts. For example, an audio bitstream generated by an upstream encoding device may be decoded to provide a presentation of audio content made of “Main Audio” and “Associated Audio.” To control the balance between the Main Audio and Associated Audio in the decoded presentation, the audio bitstream may carry audio metadata that specifies “ducking gain” at the audio frame level. Large changes in ducking gain from frame to frame without sufficiently smoothening gain values in audio rendering operations lead to audible degradations such as “zipper” artifacts in the decoded presentation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
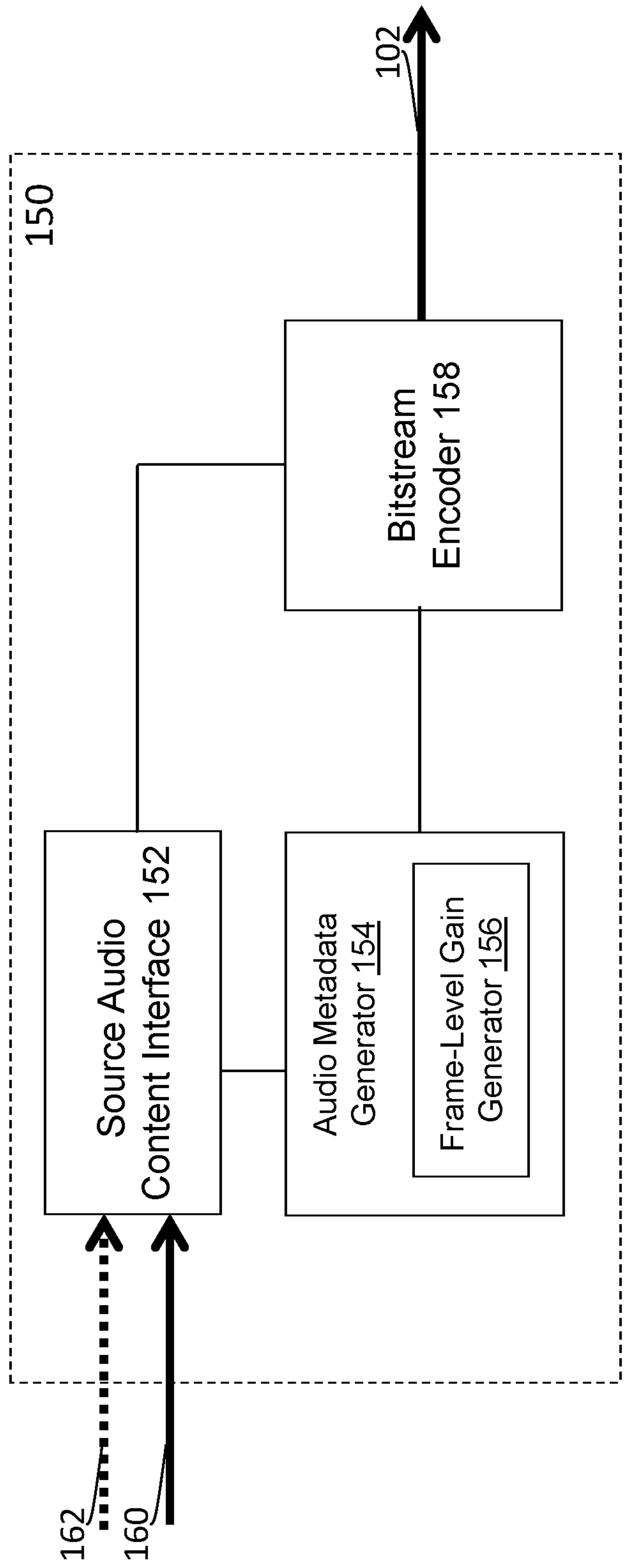
FIG. 1 illustrates an example audio encoding device.

Example embodiments, which relate to improving main-associated audio experience with efficient ducking gain application, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. General Overview
2. Upstream Audio Processor
3. Downstream Audio Processor
4. Sub-Frame Gain Generation
5. Example Process Flows
6. Implementation Mechanisms—Hardware Overview
7. Equivalents, Extensions, Alternatives and Miscellaneous

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

An audio bitstream as described herein may be encoded with audio signals containing object essence of audio objects and audio metadata (or object audio metadata) for the audio objects including but not limited to side information for reconstructing the audio objects. The audio bitstream may be coded in accordance with a media coding syntax such as AC-4 coding syntax, MPEG-H coding syntax, or the like.

The audio objects in the audio bitstream may be static audio objects only, dynamic audio objects only, or a combination of static and dynamic audio objects. Example static audio objects may include, but are not necessarily limited to only, any of: bed objects, channel content, audio bed, audio objects each of which spatial position is fixed by an assignment to an audio speaker in an audio channel configuration, etc. Example dynamic audio objects may include, but are not necessarily limited to only, any of: audio objects with time varying spatial information, audio objects with time varying motion information, audio objects whose positions are not fixed by assignments to audio speakers in an audio channel configuration, etc.

Spatial information of a static audio object such as the spatial location of the static audio object may be inferred from an (audio) channel ID of the static audio object. Spatial information of a dynamic audio object such as time varying or time constant spatial location of the dynamic audio object may be indicated or specified in the audio metadata or a specific portion thereof for the dynamic audio object.

One or more audio programs may be represented or included in the audio bitstream. Each audio program in the audio bitstream may comprise a corresponding subset or combination of audio objects among all the audio objects represented in the audio bitstream.

The audio bitstream may be directly or indirectly transmitted/delivered to, and decoded by, a recipient decoding device. The decoding device may operate with an audio renderer such as an object audio renderer to drive audio speakers (or output channels) in an audio rendering environment to reproduce a sound field (or a sound scene) depicting sound sources represented by the audio objects of the audio bitstream.

In some operational scenarios, the audio metadata of the audio bitstream may include audio metadata parameters—coded or embedded in the audio bitstream by an upstream encoding device in accordance with the media coding syntax—to indicate time varying frame-level gain values for one or more audio objects in the audio bitstream.

For example, an audio object in the audio bitstream may be specified in the audio metadata to undergo a temporal change of gain value from a preceding audio frame to a subsequent audio frame in the audio bitstream. The audio object may be a part of a "Main Audio" program that is to be concurrently mixed with an "Associated Audio" program through the time varying gain values in a ducking operation. In some embodiments, the "Main Audio" program or content includes separate "Music and effect" content/programming and separate "Dialog" content/programming which are each different from the "Associated Audio" program or content. In some embodiments, the "Main Audio" program or content includes "Music and effect" content/programming (e.g., without including "Dialog" content/programming, etc.) and the "Associated Audio" program includes "Dialog" content/programming (e.g., without including "Music and effect" content/programming, etc.).

The upstream encoding device may generate time varying ducking (attenuation) gains for some or all audio objects in the "Main Audio" to successively lower loudness levels of the "Main Audio." Correspondingly, the upstream encoding device may generate time varying ducking (boosting) gains for some or all audio objects in the "Associated Audio" to successively raise loudness levels of the "Associated Audio."

The temporal changes of gains indicated at a frame level may be carried out by a recipient audio decoding device of the audio bitstream. Under some approaches, relatively large changes of gains without sufficient smoothing by the recipient audio decoding device are prone to introducing audible artifacts such as "zipper" effect in a decoded presentation.

In contrast, techniques as described herein can be used to provide smoothening operations that prevent or reduce these audible artifacts. Under these techniques, an audio renderer in the recipient audio decoding device with built-in capabilities of handling dynamic change of audio objects in connection with movements of the audio objects can be adapted to leverage the built-in capabilities to smoothen temporal changes of gains specified for audio objects at a much finer time scale than that of audio frame. For example, the audio renderer may be adapted to implement a built-in ramp to smoothen the changes of gains of the audio objects with additional multiple sub-frame gains calculated over the built-in ramp. A ramp length may be input to the audio renderer for the built-in ramp. The ramp length represents a time interval over which the sub-frame gains in addition to or in place of the encoder-sent frame-level gains may be computed or generated using one or more gain smoothing/interpolation algorithms. Instead of applying the same frame level gain to all sub-frame units in a frame, the sub-frame gains herein may comprise smoothly differentiated values for different QFM slots and/or different PCM samples in the same audio frame. As used herein, an "encoder-sent" operational parameter such as an encoder-sent frame-level gain may refer to an operational parameter or gain that is encoded by an upstream device (including but not limited to an audio encoder) into an audio bitstream or audio metadata therein. In an example, such an "encoder-sent" operational parameter or gain may be generated and encoded into the audio bitstream by the upstream device without receiving the parameter/gain or a specific value therefor. In another example, such an "encoder-sent" operational parameter or gain may be received, converted, translated and/or encoded into the audio bitstream by the upstream device from an input parameter/gain (or an input value therefor). The input parameter/gain (or the input value therefor) can be received or specified in user input or input content received by the upstream device.

An audio object for which time varying gains such as ducking gains are received with the audio bitstream may be a static audio object (or a bed object) as a part of channel content. The audio metadata received from the bitstream may not specify a ramp length for the static audio object. The audio decoding device can modify the received audio metadata to add a specification of a ramp length for the built-in ramp. The frame-level ducking gains in the received audio metadata can be used to set or derive target gains. The ramp length and target gains enable the audio renderer to perform gain smoothening operations for the static audio object using the built-in ramp.

An audio object for which time varying gains such as ducking gains are received with the audio bitstream may be a dynamic audio object as a part of object audio. Like the static audio object, the frame-level ducking gains received in the audio bitstream can be used to set or derive target gains.

In some operational scenarios, an encoder-sent ramp length is received with the audio bitstream for the dynamic audio object. The encoder-sent ramp length and target gains may be used by the audio renderer to perform gain smoothening operations for the dynamic audio object using the built-in ramp. The use of the encoder-sent ramp length may or may not effectively prevent audible artifacts. It should be noted that, in various embodiments, the ramp length may or may not be directly or entirely generated for an audio object by the encoder. In some operational scenarios involving cinematic content, a ramp length may not be directly or entirely generated for an audio object by the encoder. The ramp length may be received by the encoder as a part of input—including but not limited to audio content itself that comprises audio samples and metadata—to the encoder, which then encodes, converts, or translates the input including the ramp length for the audio object into an output bitstream according to applicable bitstream syntaxes. In some operational scenarios involving broadcast content, a ramp length may be directly or entirely generated for an audio object by the encoder, which encodes the ramp length for the audio object along with audio samples and metadata derived from the input into an output bitstream according to applicable bitstream syntaxes.

In some operational scenarios, regardless of whether an encoder-sent ramp length is received, the audio decoding device still modifies the audio metadata to add a specification of a decoder-generated ramp length for the built-in ramp. The use of the decoder-generated ramp length can effectively prevent audible artifacts, but possibly at a risk of altering some aspects of audio rendering of the dynamic audio object, as intermediate frame level gains may be received in the audio bitstream within the time interval corresponding to the decoder-generated ramp length and may be ignored in the audio rendering of the dynamic audio object.

In some operational scenarios, regardless of whether an encoder-sent ramp length is received, the audio decoding device still modifies the audio metadata to add a specification of a decoder-generated ramp length for the built-in ramp. The use of the decoder-generated ramp length can effectively prevent audible artifacts. Additionally, optionally or alternatively, the audio renderer can implement a smoothening/interpolation algorithm that incorporates or enforces intermediate frame level gains received with the audio bitstream within the time interval corresponding to the decoder-generated ramp length. This can both effectively prevent audible artifacts and maintain audio rendering of the dynamic audio object as intended by the content creator.

Some or all techniques as described may be broadly applicable to a wide variety of media systems implementing a wide variety of audio processing techniques including but not limited to those relating to AC-4, DD+JOC, MPEG-H, and so forth.

In some embodiments, mechanisms as described herein form a part of a media processing system, including but not limited to: an audiovisual device, a flat panel TV, a handheld device, game machine, television, home theater system, soundbar, tablet, mobile device, laptop computer, netbook computer, cellular radiotelephone, electronic book reader, point of sale terminal, desktop computer, computer workstation, media streaming device, computer kiosk, various other kinds of terminals and media processors, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Upstream Audio Processor

FIG. 1 illustrates an example upstream audio processor such as an audio encoding device (or audio encoder) 150. The audio encoding device (150) may comprise a source audio content interface 152, an audio metadata generator 154, an audio bitstream encoder 158, etc. The audio encoding device 150 may be a part of a broadcast system, an internet-based media streaming server, an over-the-air network operator system, a movie production system, a local media content server, a media transcoding system, etc. Some or all of the components in the audio encoding device (150) may be implemented in hardware, software, a combination of hardware and software, etc.

The audio encoding device uses the source audio content interface (152) to retrieve or receive, from one or more content sources and/or systems, source audio content comprising one or more source audio signals 160 representing object essence of one or more source audio objects, source object spatial information 162 for the one or more audio objects, etc.

The received source audio content may be used by the audio encoding device (150) or the bitstream encoder (158) therein to generate an audio bitstream 102 encoded with one or more of a single audio program, several audio programs, commercials, movies, concurrent main and associate audio programs, consecutive audio programs, audio portions of media programs (e.g., video programs, audiovisual programs, audio-only programs, etc.), and so forth.

The object essence of the source audio objects in the one or more source audio signals (160) of the received source audio content may include position-less PCM coded audio sample data. The source object spatial information (162) in the received source audio content may be received by the audio encoding device (150) separately (e.g., in auxiliary source data input, etc.) or jointly with the object essence of the source audio objects in the one or more source audio signals (160). Example source audio signals carrying object essence of audio objects (and possibly spatial information of the audio objects) as described herein may include, but are not necessarily limited to only, some or all of: source channel content signals, source audio bed channel signals, source object audio signals, audio feeds, audio tracks, dialog signals, ambient sound signals, etc.

The source audio objects may comprise one or more of: static audio objects (which may be referred to as "bed objects" or "channel content"), dynamic audio objects, etc. A static audio object or a bed object may refer to a non-moving object that is mapped to a specific speaker or channel location in an (e.g., output, input, intermediate, etc.) audio channel configuration. A static audio object as described herein may represent or correspond to some or all of an audio bed to be encoded into the audio bitstream (102). A dynamic audio object as described herein may freely move around in some or all of a 2D or 3D sound field to be depicted by the rendering of audio data in the audio bitstream (102).

The source object spatial information (162) comprises some or all of: location and extent, importance, spatial exclusions, divergence, etc., of the source audio objects.

The audio metadata generator (154) generates audio metadata to be included or embedded in the audio bitstream (102) from the received source audio content such as the source audio signals (160) and the source object spatial information (162). The audio metadata comprises object audio metadata, side information, etc., some or all of which can be carried in audio metadata containers, fields, parameters, etc., separate from audio sample data encoded in the audio bitstream (102) in accordance with a bitstream coding syntax such as AC-4, MPEG-H, etc.

The audio metadata transmitted to a recipient audio reproduction system may include audio metadata portions that guide an object audio renderer (implementing some or all of an audio rendering stage) of the recipient reproduction system to render audio data—to which the audio metadata correspond—in a specific playback (or audio rendering) environment in which the recipient reproduction system operates. Different audio metadata portions that reflect changes in different audio scenes may be sent to the recipient reproduction system for rendering the audio scenes or subdivisions thereof.

The object audio metadata (OAMD) in the audio bitstream (102) may specify, or be used to derive, audio operational parameters for a recipient device of the audio bitstream (102) to render an audio object. The side information in the audio bitstream (102) may specify, or be used to derive, audio operational parameters for a recipient device of the audio bitstream (102) to reconstruct audio objects from audio signals, which are encoded by the audio encoding device (150) in and decoded by the recipient device from the audio bitstream (102).

Example (e.g., encoder-sent, upstream-device-generated, etc.) audio operational parameters represented in the audio metadata of the audio bitstream (102) may include, but are not necessarily limited to only, object gains, ducking gains, dialog normalization gains, dynamic range control gains, peak limiting gains, frame level/resolution gains, positions, media description data, renderer metadata, panning coefficients, submix gains, downmix coefficients, upmix coefficients, reconstruction matrix coefficients, timing control data, etc., some or all of which may dynamically change as one or more functions of time.

In some operational scenarios, each (e.g., gain, timing control data, etc.) of some or all of the audio operational parameters represented in the audio bitstream (102) may be broadband or wideband, applicable to all frequencies, samples, or subbands in an audio frame.

Audio objects represented or encoded in the audio bitstream (102), as generated by the audio encoding device (150), may or may not be identical to the source audio objects represented in the source audio content received by the audio encoding device (150). In some operational scenarios, spatial analysis is performed on the source audio objects to combine or cluster one or more source audio objects into an (encoded) audio object represented in the audio bitstream (102) with spatial information of the encoded audio object. The spatial information of the encoded audio object to which the one or more source audio objects are combined or clustered may be derived from source spatial information of the one or more source audio objects in the source object spatial information (162).

Audio signals representing the audio objects—which may be the same as or may be derived or clustered from the source audio objects—may be encoded in the audio bitstream (102) based on a reference audio channel configuration (e.g., 2.0, 3.0, 4.0, 4.1, 4.1, 5.1, 6.1, 7.1, 7.2, 10.2, a 10-60 speaker configuration, a 60+ speaker configuration, etc.). For example, an audio object may be panned to one or more reference audio channels (or speakers) in the reference audio channel configuration. A submix (or a downmix) for a reference audio channel (or speaker) in the reference audio channel configuration may be generated from some or all contributions from some or all of the audio objects through panning. The submix may be used to generate a corresponding audio signal for the reference channel (or speaker) in the reference audio channel configuration. Reconstruction operational parameters may be derived at least in part from panning coefficients, spatial information of the audio objects, etc., used in the encoder-side panning and submixing/downmixing operations, and passed in the audio metadata (e.g., side information, etc.) to enable the recipient device of the audio bitstream (102) to reconstruct the audio objects represented in the audio bitstream (102).

The audio bitstream (102) may be directly or indirectly transmitted or otherwise delivered to a recipient device in a series of transmission frames. Each transmission frame may comprise one or more audio frames that carries series of PCM samples or encoded audio data such as QMF matrixes for the same (frame) time interval (e.g., 20 milliseconds, 10 milliseconds, a short or long frame time interval, etc.) for all audio channels (or speakers) in the reference audio channel configuration. The audio bitstream (102) may comprise a sequence of consecutive audio frames comprising PCM samples or encoded audio data covering a sequence of consecutive (frame) time intervals. The sequence of consecutive (frame) time intervals may constitute a (e.g., replaying, playback, live broadcast, live streaming, etc.) time duration of a media program, audio content of which is encoded or provided at least in part in the audio bitstream (102).

A time interval represented by an audio frame as described herein may comprise a plurality of sub-frame time intervals representing by a plurality of corresponding QMF (time) slots. Each sub-frame time interval in the plurality of sub-frame time intervals of the audio frame may correspond to a respective QMF slot in the plurality of corresponding QMF slots. A QFM slot as described herein may be represented by a matrix column in a QMF matrix of the audio frame and comprises spectral elements for a plurality of frequencies or subbands that collectively constitute a broadband or wideband of frequencies (e.g., covering some or all of the entire frequency band audible to the Human Auditory System, etc.).

The audio encoding device (150) may perform a number of (encoder-side) audio processing operations that change gains for one or more audio objects (among all the audio objects) represented in the audio bitstream (102). These gains may be directly or indirectly applied by a recipient device of the audio bitstream (102) to the one or more audio objects—for example, to change loudness levels or dynamics of the one or more audio objects—in audio rendering operations.

Example (encoder-side) audio processing operations may include, but are not limited to, ducking operations, dialog enhancement operations, user-controlled gain transitioning operations (e.g., based on user input provided by a content creator or producer, etc.), downmixing operations, dynamic range control operations, peak limiting, cross fading, consecutive or concurrent program mixing, gain smoothing, fade-out/fade-in, program switching, or other gain transitioning operations.

By way of example but not limitation, the audio bitstream (102) may cover a (gain transitioning) time segment in which a first audio program of a "Main Audio" type (referred to as a "Main Audio" program) and a second audio program of an "Associated Audio" type (referred to as an "Associated Audio" program) are encoded or included in the audio bitstream (102) for a recipient device of the audio bitstream (102) to render concurrently. The "Main Audio" program may comprise a first subset of audio objects in the audio objects encoded or represented in the audio bitstream (102) or one or more first audio sub-streams thereof. The "Associated Audio" program may comprise a second subset of audio objects—different from the first subset of audio objects—in the audio objects encoded or represented in the audio bitstream (102) or one or more second audio sub-streams thereof. The first subset of audio objects may be mutually exclusive with, or alternatively partly overlapping with, the second subset of audio objects.

The audio encoding device (150) or a frame-level gain generator (156) therein—which may, but is not limited to, be a part of the audio metadata generator (154)—may perform ducking operations to (e.g., dynamically, over the time segment, etc.) change or control a dynamic balance (of loudness) between the "Main Audio" program and the "Associated Audio" program over the (gain transition) time segment. For example, these ducking operations can be performed to decrease loudness levels of some or all audio objects in the first subset of audio objects carried in the one or more first sub-streams of the "Main Audio" program while concurrently increasing loudness levels of some or all audio objects in the second subset of audio objects in the one or more second sub-streams of the "Associated Audio" program.

To control the balance between the "Main Audio" program and the "Associated Audio" program in the decoded presentation, the audio metadata included in the audio bitstream (102) may provide or specify ducking gains for the first subset of audio objects in the "Main Audio" program and the second subset of audio objects in the "Associated Audio" program in accordance with a bitstream coding syntax. A content creator or producer can use the ducking gains to scale or "duck" the "Main Audio" program content and concurrently scale or "boost" the "Associated Audio" program content to make the "Associated Audio" program content more intelligible than otherwise.

The ducking gains can be transmitted in the audio bitstream (102) at a frame level or on a per frame basis (e.g., two gains respectively for main and associated audio for each frame, a gain for each frame at which the gain changes from a previous value to the next different value, etc.). As used herein, "at . . . frame level" (or "at . . . frame resolution") may mean that an individual instance/value of an operational parameter is provided or specified for a single audio frame or for multiple audio frames—e.g., a single instance/value of the operational parameter per frame. Specifying gains at the frame level can reduce bitrate usage (e.g., relative to specifying gains at a higher resolution) in connection with encoding, transmitting, receiving and/or decoding the audio bitstream (102).

The audio encoding device (150) may avoid or reduce large changes of a ducking gain (e.g., for one or more audio objects, etc.) from frame to frame to improve user listening experience. The audio encoding device (150) may cap gain change no more than a maximum allowable gain change value between two consecutive audio frames. For example, a −12 dB gain change may be distributed—for example by the frame-level gain generator (156) of the audio encoding device (150)—over six consecutive audio frames with −2 dB steps each below the maximum allowable gain change value.

3. Downstream Audio Processor

Figure 2A:
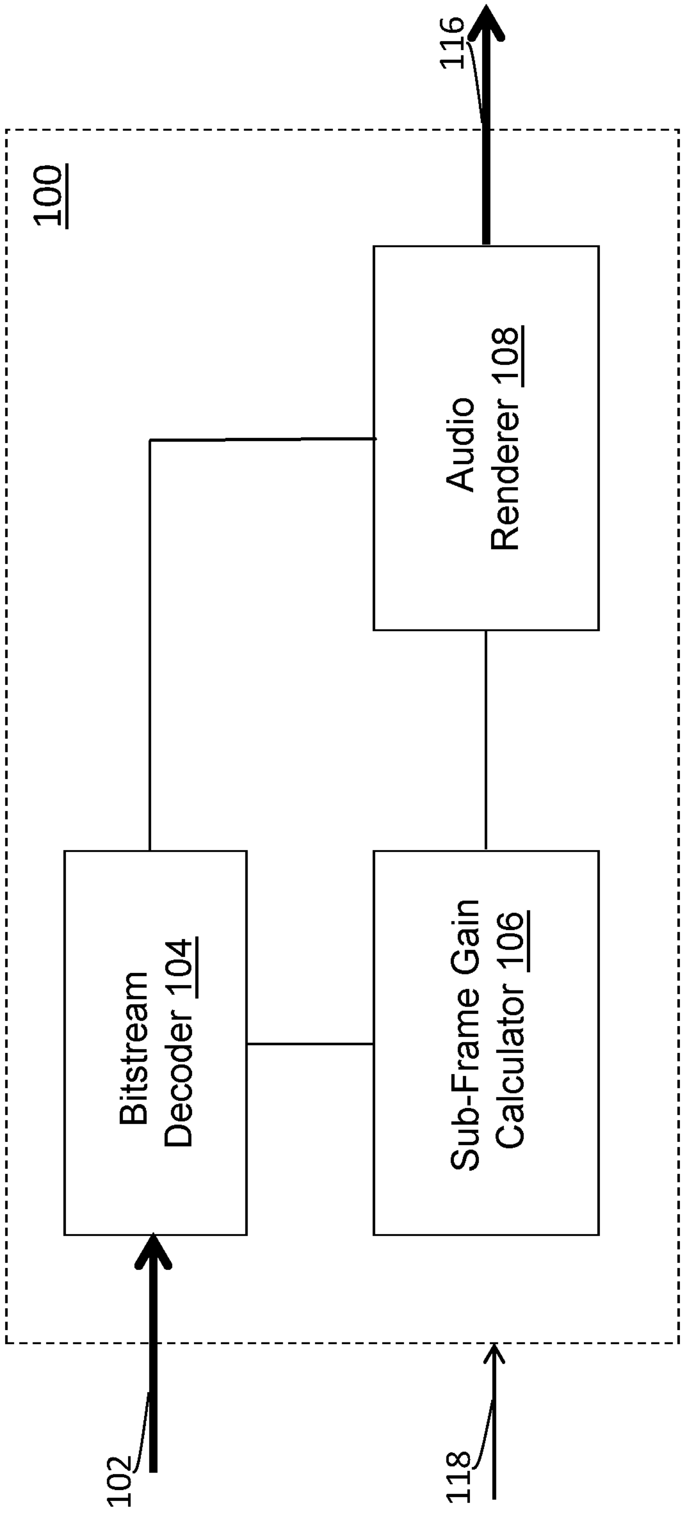
FIG. 2A through FIG. 2C illustrate example downstream audio processors.

FIG. 2A illustrates an example downstream audio processor such as an audio decoding device 100 comprising an audio bitstream decoder 104, a sub-frame gain calculator 106, an (e.g., integrated, distributed, etc.) audio renderer 108, etc. Some or all of the components in the audio decoding device (100) may be implemented in hardware, software, a combination of hardware and software, etc.

The bitstream decoder (104) receives the audio bitstream (102) and performs, on the audio bitstream (102), demultiplexing and decoding operations to extract audio signals and audio metadata that has been encoded in the audio bitstream (102) by the audio encoding device (150).

The audio metadata extracted from the audio bitstream (102) may include, but are not necessarily limited to only, object gains, ducking gains, dialog normalization gains, dynamic range control gains, peak limiting gains, frame level/resolution gains, positions, media description data, renderer metadata, panning coefficients, submix gains, downmix coefficients, upmix coefficients, reconstruction matrix coefficients, timing control data, etc., some or all of which may dynamically change as one or more functions of time.

The extracted audio signals and some or all of the extracted audio metadata including but not limited to side information may be used to reconstruct audio objects represented in the audio bitstream (102). In some operational scenarios, the extracted audio signals may be represented in a reference audio channel configuration. Time varying or time constant reconstruction matrixes may be created based on the side information and applied to the extracted audio signals in the reference audio channel configuration to generate or derive the audio objects. The reconstructed audio objects may include one or more of: static audio objects, (e.g., audio bed objects, channel content, etc.), dynamic audio objects (e.g., with time varying or time constant spatial locations, etc.), and so on. Object properties such as location and extent, importance, spatial exclusions, divergence, etc., may be specified as a part of the audio metadata or object audio metadata (OAMD) therein received by way of the audio bitstream (102).

The audio decoding device (100) may perform a number of (decoder-side) audio processing operations related to decoding and rendering the audio objects in an output audio channel configuration (e.g., 2.0, 3.0, 4.0, 4.1, 4.1, 5.1, 6.1, 7.1, 7.2, 10.2, a 10-60 speaker configuration, a 60+ speaker configuration, etc.). Example (decoder-side) audio processing operations may include, but are not limited to, ducking operations, dialog enhancement operations, user-controlled gain transitioning operations (e.g., based on user input provided by a content consumer or end user, etc.), downmixing operations, or other gain transitioning operations.

Some or all of these decoder-side operations may involve applying differentiated gains (or differentiated gain values) to an audio object on the decoder side at a temporal resolution finer than that of a frame level. Example temporal resolutions finer than that of the frame level may include, but not limited to, those related to one or more of: sub-frame levels, on a per QMF-slot basis, on a per PCM sample basis, and so forth. These decoder-side operations applied at a relatively fine temporal resolution may be referred to as gain smoothing operations.

For example, the audio bitstream (102) may cover a gain changing/transitioning time duration (e.g., time segment, interval, sub-interval, etc.) in which a "Main Audio" program and an "Associated Audio" program are encoded or included in the audio bitstream (102) for a recipient device of the audio bitstream (102) to render concurrently with time varying gains. As previously noted, the "Main Audio" and "Associated Audio" programs may respectively comprise a first subset and a second subset of audio objects in the audio objects encoded or represented in the audio bitstream (102) or audio sub-streams thereof.

An upstream audio encoding device (e.g., 150 of FIG. 1, etc.) may perform ducking operations to (e.g., dynamically, over the gain changing/transitioning time duration, etc.) change or control a dynamic balance (of loudness) between the "Main Audio" program and the "Associated Audio" program over the (gain transition) time segment. As a result, time varying (e.g., ducking, etc.) gains may be specified in the audio metadata of the audio bitstream (102). These gains may be provided in the audio bitstream (102) at a frame level or on a per frame basis.

The encoder-sent, bitstream transmitted, frame-level gains—which in the present example are related to the ducking operations, but may be generally extended to time varying gains related to any gain changing/transitioning operations performed by the upstream encoding device—may be decoded by the audio decoding device (100) from the audio bitstream (102).

In a decoded presentation (or audio rendering) of the audio content in the audio bitstream (102) as intended by the content creator, the ducking gains may be applied to the "Main audio" program or content represented in the audio bitstream (102), while corresponding (e.g., boosting, etc.) gains may be concurrently applied to the accompanying "Associated Audio" program or content represented in the audio bitstream (102).

Additionally, optionally or alternatively, in some operational scenarios, the audio decoding device (100) may receive, from one or more user controls (or user interface components) provided with the audio decoding device (100) and interacted with a listener, user input 118. The user input (118) may specify, or may be used to derive, user adjustments to be applied to the time varying frame-level gains received in the audio bitstream (102) such as the ducking gains in the present example. Through the one or more user controls, the listener can cause the Main/Associated balance to be changed, for example, to make the "Main Audio" more audible than the "Associated Audio," or the other way around, or another balance between the "Main Audio" and the "Associated Audio." The listener can also choose to listen to either the "Main Audio" or "Associated Audio" single-handedly or entirely; in this case, only one of the "Main Audio" and "Associated Audio" programs may need to be decoded and rendered in the decoded presentation of the audio bitstream (102) for the time duration in which both the "Main Audio" and "Associated Audio" programs are represented in the audio bitstream (102).

For the purpose of illustration only, the audio objects as decoded or generated from the audio bitstream (102) comprises a specific audio object for which frame-level time varying gains are specified in or derived from the audio metadata in the audio bitstream (102), which may possibly be further adapted or modified based at least in part on the user input (118)).

The specific audio object may refer to any audio object for which time varying gains are specified in the audio metadata in the audio bitstream (102). In some operational scenarios, a first subset of audio objects in the audio objects decoded or generated from the audio bitstream (102) represents a "Main Audio" program, whereas a second subset of audio objects in the audio objects decoded or generated from the audio bitstream (102) represents an "Associated Audio" program. The specific audio object may belong to one of: the first subset of audio objects or the second subset of audio objects.

The frame-level time-varying gains for the specific audio object may include a first gain (value) and a second gain (value) respectively for a first audio frame and a second audio frame in a sequence of audio frames carried in the audio bitstream (102).

The first audio frame may correspond to a first time point (e.g., logically represented by a first frame index, etc.) in a sequence of time points (e.g., frame indexes, etc.) in the decoded presentation and comprise first audio signal portions used to derive a first object essence portion (e.g., PCM samples, transform coefficients, a position-less audio data portion, etc.) of the specific audio object. Similarly, the second audio frame may correspond to a second time point (e.g., logically represented by a second frame index, subsequent to or succeeding the first time point, etc.) in the sequence of time points (e.g., frame indexes, etc.) in the decoded presentation and comprise second audio signal portions used to derive a second object essence portion (e.g., PCM samples, transform coefficients, a position-less audio data portion, etc.) of the specific audio object.

In an example, the first audio frame and the second audio frame may be two consecutive audio frames in the sequence of audio frames encoded in the audio bitstream (102). In another example, the first audio frame and the second audio frame may be two non-consecutive audio frames in the sequence of audio frames encoded in the audio bitstream (102); the first and second audio frames may be separated by one or more intervening audio frames in the sequence of audio frames.

The first gain and the second gain may be related to one of: ducking operations, dialog enhancement operations, user-controlled gain transitioning operations, downmixing operations, or other gain transitioning operations such as any combination of the foregoing.

The audio decoding device (100) or the sub-frame gain calculator (106) therein may determine whether sub-frame gain smoothing operations are to be performed for the first gain and the second gain. This determination may be performed based on at least in part on a minimum gain difference threshold, which may be a zero or non-zero value. In response to determining that a difference (e.g., absolute value, magnitude, etc.) between the first gain and the second gain exceeds the minimum gain difference threshold (e.g., absolute value, magnitude, etc.), the sub-frame gain calculator (106) applies sub-frame gain smoothing operations on audio frames between the first and second audio frames (e.g., inclusive, non-inclusive, etc.).

In some operational scenarios, the minimum gain difference threshold may be non-zero; thus, gain smoothing operations or corresponding computations may not be invoked when the difference in the first and second gains is relatively small as compared with the non-zero minimum threshold, as the small difference is unlikely to cause audible artifact to occur.

Additionally, optionally or alternatively, this determination may be performed based on at least in part on a minimum gain change rate threshold. In response to determining that a rate of change (e.g., absolute value, magnitude, etc.) between the first gain and the second gain exceeds the minimum gain change rate threshold (e.g., absolute value, magnitude, etc.), the sub-frame gain calculator (106) applies sub-frame gain smoothing operations on audio frames between the first and second audio frames (e.g., inclusive, non-inclusive, etc.). The rate of change between the first gain and the second gain may be computed as the difference between the first gain and the second gain divided by a time difference between the first gain and the second gain. In some operational scenarios, the time difference may be logically represented or computed based on a difference between a first frame index of the first audio frame and a second frame index of the second audio frame.

In some operational scenarios, the minimum gain change rate threshold may be non-zero; thus, gain smoothing operations or corresponding computations may not be invoked when the rate of change between the first and second gains is relatively small as compared with the minimum gain change rate threshold, as the small rate of change is unlikely to cause audible artifact to occur.

In some operational scenarios, a determination of whether to perform sub-frame gain smoothing operations may be symmetric. For example, the same minimum gain difference threshold or the same minimum gain change rate threshold may be used to make the determination whether a change in gain values or a rate of change is positive (e.g., boosting or raising, etc.) or negative (e.g., ducking or lowering, etc.). The absolute value of the difference may be compared with the threshold in absolute value in the determination.

The human auditory system may react to increasing loudness levels and decreasing loudness levels with different integration time. In some operational scenarios, a determination of whether to perform sub-frame gain smoothing operations may be asymmetric. For example, different minimum gain difference thresholds or different minimum gain change rate thresholds—as converted to absolute values or magnitudes—may be used to make the determination depending on a change in gain values or a rate of change is positive (e.g., boosting or raising, etc.) or negative (e.g., ducking or lowering, etc.). The change in gain values or the rate of change may be converted to an absolute value or magnitude and then compared with a specific one of the different minimum gain difference thresholds or different minimum gain change rate thresholds.

Additionally, optionally or alternatively, one or more other determination factors may be used to determine whether gain smoothing operations such as interpolations are to be performed. Example determination factors may include, but are not necessarily limited to only, any of: aspects and/or properties of audio content, aspects and/or properties of audio objects, system resource availability of audio decoding and/or encoding devices or processing components therein, system resource usage of audio decoding and/or encoding devices or processing components therein, and so forth.

In response to determining that gain smoothing operations are to be performed on the specific audio object in relation to the first gain specified for the first audio frame and the second gain specified for the second audio frame, the sub-frame gain calculator determines a (e.g., decoder-side inserted, timing data, etc.) ramp length for a ramp used to smoothen or interpolate gains to be applied to the specific audio object between the first gain specified for the first audio frame and the second gain specified for the second audio frame. Example gain smoothing/interpolation algorithms as described herein may include, but are not necessarily limited to, a combination of one or more of: piecewise constant interpolation, linear interpolation, polynomial interpolation, spline interpolation, and so on. Additionally, optionally or alternatively, gain smoothing/interpolation operations may be individually applied to individual audio channels, individual audio objects, individual time period/intervals, and so on. In some operational scenarios, a smoothing/interpolation algorithm as described herein may implement a smoothing/interpolation function modified or modulated with a psychoacoustic function, which may be a non-linear function depicting or representing a perception model of the human auditory system. The smoothing/interpolation algorithm or timing control implemented therein may be specifically designed to provide smoothened loudness levels with no or little perceptible audio artifacts such as "zipper" effect.

The audio metadata in the audio bitstream (102) as provided by the upstream encoding device may be free of a specification of the ramp length. In some operational scenarios, the audio metadata may specify a separate encoder-sent ramp length for the specific audio object; this separate encoder-sent ramp length may be different from the (e.g., decoder-generated, etc.) ramp length as determined by the sub-frame gain calculator (106). In an example, the specific audio object is a dynamic audio object (e.g., non-bed object, non-channel content, with time varying spatial information, etc.) in a cinematic media program. In another example, the specific audio object is a static audio object in a broadcast media program. By way of comparison, in some operational scenarios, the audio metadata may not specify any separate encoder-sent ramp length for the specific audio object. In an example, the specific audio object is a static audio object (e.g., bed object, channel content, with a fixed location corresponding to a channel ID in an audio channel configuration, etc.) in a non-broadcast media program, or in a broadcast media program for which the encoder has not specified a ramp length for the audio object. In another example, the specific audio object is a dynamic audio object in a non-cinema media program for which the encoder has not specified a ramp length for the audio object.

To implement gain smoothing operations as described herein, the sub-frame gain calculator (106) may calculate or generate sub-frame gains based on the first gain, the second gain, and the ramp length. Example sub-frame gains may include, but are not necessarily limited to, any of: broadband gains, wideband gains, narrow band gains, frequency-specific gains, bin-specific gains, time domain gains, transform domain gains, frequency domain gains, gains applicable to encoded audio data in QFM matrixes, gains applicable to PCM sample data, etc. The sub-frame gains may differ from the frame-level gains obtained from the audio bitstream (102). For example, the sub-frame gains generated or calculated for the time interval covering the ramp of the ramp length may be a superset of any frame-level gains specified for the same time interval in the audio stream (102). The sub-frame gains may include one or more interpolated gains at a sub-frame level, on a per QFM slot basis, on a per PCM sample basis, and so forth. Within an audio frame between the first and second frames inclusive, two different sub-frame units such as two different QFM slot basis, two different PCM samples, etc., may be assigned to two different sub-frame gains (or different sub-frame gain values).

In some operational scenarios, the sub-frame gain calculator (106) interpolates the first gain specified for the first audio frame to the second gain specified for the second audio frame to generate the sub-frame gains for the specific audio object over the time interval represented by the ramp with the ramp length. Contributions to the specific audio object from different sub-frame units such as QMF slots or PCM samples between the first audio frame and the second audio frame may be assigned with different (or differentiated) sub-frame gains among the calculated sub-frame gains.

The sub-frame gain calculator (106) may generate or derive sub-frame gains for some or all of the audio objects represented in the audio bitstream (102) based at least in part on the frame-level gains specified for audio frames containing audio data contributions to the audio objects. These sub-frame gains for some or all of the audio objects—e.g., including those for the specific audio object—represented in the audio bitstream (102) may be provided by the sub-frame gain calculator (106) to the audio renderer (108).

In response to receiving the sub-frame gains for the audio objects, the audio renderer (108) performs gain smoothing operations to apply differentiated sub-level gains to the audio objects at a temporal resolution finer than that of a frame level, such as at a sub-frame levels, on a per QMF-slot basis, on a per PCM sample basis, and so forth. Additionally, optionally or alternatively, the audio renderer (108) causes a sound field represented by the audio objects, with the sub-frame gains applied to the audio objects, to be rendered by a set of audio speakers operating in a specific playback environment (or a specific output audio channel configuration) with the audio decoding device (100).

Under some approaches, a decoder may apply changes in gain values such as those related to ducking a "Main Audio" program while concurrently boosting an "Associated Audio" program at a frame level. Frame-level gains as specified in an audio bitstream may be applied on a per frame basis. Thus, each sub-frame units such as QMF slots or PCM samples in an audio frame may implement the same broadband or wideband (e.g., perceptual, non-perceptual, etc.) gain as specified for the audio frame without gain smoothing or interpolation. Without sub-frame gain smoothing, this would lead to "zipper" artifacts in which discontinuous changes of loudness levels could be perceived (as an audible artifact) by a listener.

In contrast, under techniques as described herein, gain smoothing operations can be implemented or performed based at least in part on sub-frame gains calculated at a finer temporal resolution than the frame level. As a result, audible artifacts such as "zipper" artifacts can be eliminated or significantly reduced.

Under some approaches, an upstream device other than an audio renderer may implement or apply interpolation operations such as a linear interpolation of a linear gain to QMF slots or PCM samples in the audio frame. However, this would be computationally costly, complex and/or repetitive given the audio frame may comprise many contributions of audio data portions to many audio signals, many audio objects, etc.

In contrast, under techniques as described herein, gain smoothing operations—including but not limited to performing interpolation that generates smoothly varying sub-frame gains over a time period or interval of a ramp—can be performed in part by an audio renderer (e.g., an object audio renderer, etc.) that may have already been tasked to process audio data of audio objects at a finer temporal scales than the frame level, for example based on built-in ramp(s) that may have already implemented by the audio renderer to handle movements of any audio object from one spatial location to another spatial location in a decoded presentation or audio rendering of audio objects. These techniques can be implemented to use frame-level gains received from an upstream device to generate or compute sub-frame gains for each audio object in some or all audio objects to be provided to an audio renderer. Sub-frame gain smoothing operations based on these sub-frame gains in response to the time varying frame-level gains may be implemented as a part of, or merged into, sub-frame audio rendering operations performed by the audio renderer.

Additionally, optionally or alternatively, audio sample data such as PCM audio data representing audio data of audio objects does not have to be decoded before applying sub-frame gains as described herein to the audio sample data. Audio metadata or OAMD to be input to or used by an audio renderer may be modified or generated. In other words, these sub-frame gains may be generated without decoding encoded audio data carried in an audio bitstream into the audio sample data in some operational scenarios. The audio renderer can then decode the encoded audio data into the audio sample data and apply the sub-frame gains to audio data portions in sub-frame units in the audio sample data as a part of rendering the audio objects with audio speakers of an (actual) output audio channel configuration.

As a result, no or little additional computational costs are incurred under the techniques as described herein. In addition, an upstream device (e.g., before the audio renderer, etc.) does not need to implement these sub-frame audio processing operations in response to time varying frame level gains. Thus, repetitive and complex computations or manipulations at the sub-frame level may be avoided or significantly reduced under the techniques as described herein.

4. Sub-Frame Gain Generation

In some operational scenarios, an audio stream (e.g., 102 of FIG. 1 or FIG. 2A, etc.) as described herein comprises a set of audio objects and audio metadata for the audio objects. To generate a decoded presentation or audio rendering of the audio objects decoded from the audio stream (102), an audio renderer (e.g., 108 of FIG. 2A, etc.) such as an object audio renderer can be integrated with an audio decoding device (e.g., 100 of FIG. 2A, etc.) or with a device (e.g., 100-2 of FIG. 2C, etc.) operating with an audio decoding device (e.g., 100-1 of FIG. 2B, etc.).

The audio decoding device (100, 100-1) can set up object audio metadata as input to the audio renderer (108) to guide the integrated audio renderer (108) to perform audio processing operations to render the audio objects. The object audio metadata may be generated at least in part from the audio metadata received in the audio bitstream (102).

An audio object such as a dynamic audio object can move in an audio rendering environment (e.g., a home, a cinema, an amusement park, a music bar, an opera house, a concert hall, bars, homes, an auditorium, etc.). The audio decoding device (100) can generate timing data to be input to the audio renderer (108) as a part of the object audio metadata. The decoder-generated timing data may specify a ramp length for a built-in ramp implemented by the audio renderer (108) to handle transitions such as spatial and/or temporal variations (e.g., in object gains, panning coefficients, sub-mix/downmix coefficients, etc.) of audio objects caused by the movements of the audio objects.

The built-in ramp can operate on a sub-frame temporal scale (e.g., down to sample level in some operational scenarios, etc.) and smoothly transition audio objects from one place to another in the audio rendering environment. Once the audio renderer (108) or its algorithm has determined a target gain reflecting or representing a final destination of the ramp for smoothing gains of an audio object, the built-in ramp in the audio renderer (108) can be applied to calculate or interpolate gains over sub-frame units such as QMF slots, PCM samples, and so on.

As compared with any ramp outside the audio renderer (108), this built-in ramp provides distinct advantages of being active in a signal path for the (actual) audio rendering of all audio objects to an (actual) output audio channel configuration operating with the audio renderer (108). As a result, audible artifacts such as "zipper" effects can be relatively effectively and easily prevented or reduced by the built-in ramp implemented in audio decoding devices.

By way of comparison, under other approaches, any ramp or an interpolation process implemented at an upstream device such as an audio encoding device (150), for example at a frame level, may not be based on information on the actual audio channel configuration and may be based on a presumptive reference audio channel configuration different from the actual audio channel configuration (or audio rendering capabilities). As a result, audible artifacts such as "zipper" effects may not be effectively prevented or reduced by such ramp or interpolation process in upstream devices.

Sub-frame gain smoothing operations (e.g., using a built-in ramp, etc.) as described herein may be applied to a wide variety of to-be-rendered input audio contents with different combinations of audio objects and/or audio object types. Example input audio contents may include, but are not necessarily limited to only, any of: channel content, object content, a combination of channel content and object content, and so forth.

For channel content represented by one or more static audio objects (or bed objects), the object audio metadata input to the audio renderer (108) may comprise (e.g., encoder sent, bitstream transmitted, etc.) audio metadata parameters specifying channel IDs to which the static audio objects are associated. Spatial positions of the static audio objects can be given by or inferred from the channel IDs specified for the static audio objects.

The audio decoding device (100) can generate or re-generate audio metadata parameters and use the decoder-generated audio metadata parameters (or parameter values) to control audio rendering operations of the channel content or the static audio objects therein by the (e.g., integrated, separate, etc.) audio renderer (108). For example, for some or all of the static audio objects in the channel content, the audio decoding device (100) can set or generate timing control data such as ramp length(s) to be used by the built-in ramp implemented in the audio renderer (108). Thus, for static audio objects corresponding to channels in the output audio channel configuration, the audio decoding device (100) can provide frame-level gains such as ducking gains received in the audio bitstream (102) and the decoder-generated ramp length(s) in the object audio metadata input to the audio renderer (108), alongside spatial information of these static audio objects corresponding to the channel IDs for the purpose of performing gain smoothing using the ramp with the decoder-generated ramp length(s).

For example, for ducking operations in connection with a "Main Audio" program and an "Associated Audio" program represented in the audio bitstream (102), the audio decoding device (100)—e.g., the sub-frame gain calculator (106), the audio renderer (108), a combination of processing elements in the audio decoding device (100), etc.—can compute or generate a first set of gains including first decoder-generated sub-frame gains to be applied to a first subset of audio objects constituting the "Main Audio" program, and compute or generate a second set of gains including second decoder-generated sub-frame gains to be concurrently applied to a second subset of audio objects constituting the "Associated Audio" program. The first and second sets of gains can reflect attenuation of a transmitted amount of ducking in an overall rendering of the "Main Audio" content as well as corresponding enhancement of a transmitted amount of boosting in an overall rendering of the "Associated Audio" content.

Figure 3A:
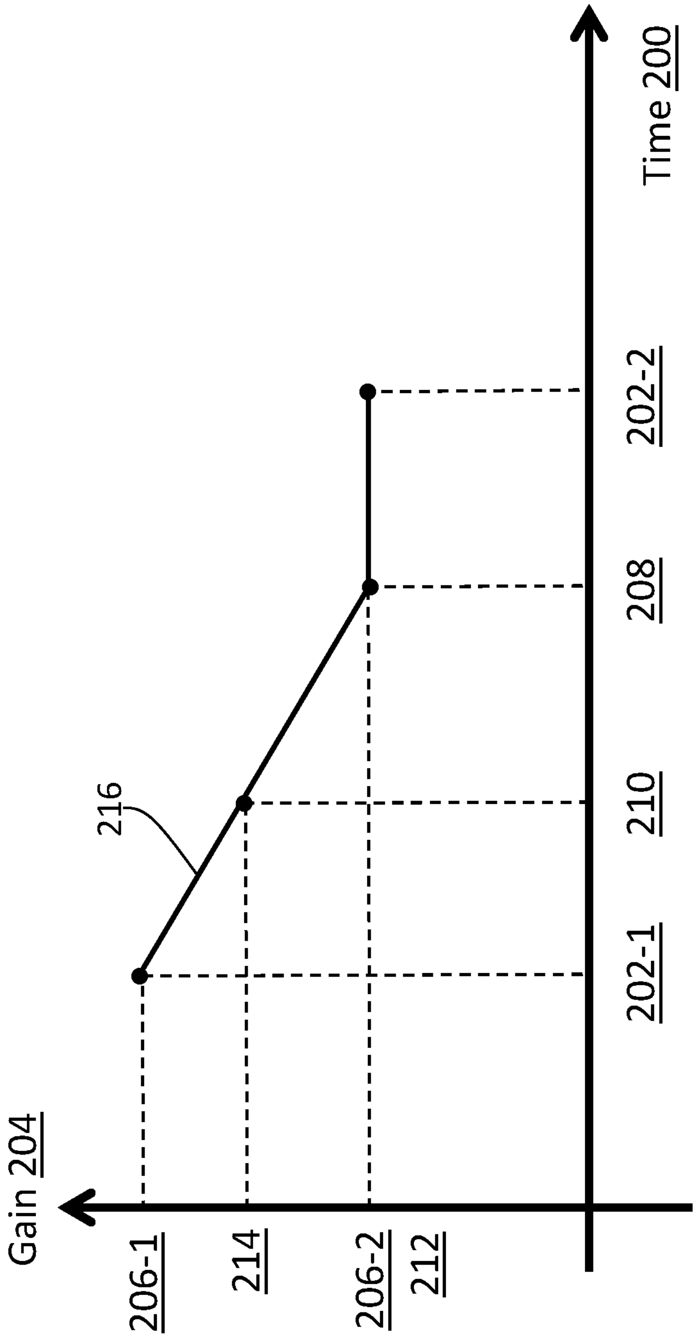
FIG. 3A through FIG. 3D illustrate example sub-frame gain smoothing operations.

FIG. 3A illustrates example gain smoothing operations with respect to an audio object such as a static audio object as a part of channel content. These operations may be at least in part performed by the audio renderer (108). For the purpose of illustration, the horizontal axis of FIG. 3A through FIG. 3D represent time 200. The vertical axis of FIG. 3A through FIG. 3D represent gains 204.

Frame-level gains for the static audio object may be specified in audio metadata received with an audio bitstream (e.g., 102 of FIG. 1 or FIG. 2A, etc.). These frame-level gains may comprise a first frame-level gain 206-1 for a first audio frame and a second frame-level gain 206-2 for a second different audio frame. The first audio frame and the second frame may be a part of a sequence of audio frames in the audio bitstream (102). The sequence of audio frames may cover a playback time duration. In an example, the first audio frame and the second frame may be two consecutive audio frames in the sequence of audio frames. In another example, the first audio frame and the second frame may be two non-consecutive audio frames separated by one or more intervening audio frames in the sequence of audio frames. The first audio frame may comprise a first audio data portion for a first frame time interval starting at a first playback time point 202-1, whereas the second audio frame may comprise a second audio data portion for a second frame time interval starting at a second playback time point 202-2.

The audio metadata received in the audio bitstream (102) may be free of a specification, or may not carry, timing control data such as a ramp length for applying gain smoothing with respect to the first and second frame-level gains (206-1 and 206-2).

An audio decoding device (100) including and/or operating with the audio renderer (108) may determine (e.g., based on thresholds, based on inequality of the first and second gains, based on additional determination factors, etc.) whether sub-frame gain smoothing operations should be performed with respect to the first and second gains. In response to determine that sub-frame gain smoothing operations should be performed with respect to the first and second gains, the audio decoding device (100) generates timing control data such as a ramp length of a ramp 216 for applying the sub-frame gain smoothing with respect to the first and second frame-level gains (206-1 and 206-2). Additionally, optionally or alternatively, the audio decoding device (100) may set a final or target gain 212 at the end of the ramp (216). The final or target gain (212) may, but is not limited to, be the same as the second frame-level gain (206-2).

The ramp length for the ramp (216) may be specified in object audio metadata input to the audio renderer (108) as a (gain change/transition) time interval over which the sub-frame gain smoothing operations are to be performed. The ramp length or the time interval for the ramp (216) may be input to or used by the audio renderer (108) to determine a final or target time point 208 representing the end of the ramp (216). The final or target time point (208) for the ramp (216) may or may not be the same as the second time point (202-2). The final or target time point (208) for the ramp (216) may or may not be aligned with a frame boundary separating two adjacent audio frames. For example, the final or target time point (208) for the ramp (216) may be aligned with a sub-frame unit such as a QFM slot or a PCM sample.

In response to receiving the object audio metadata, the audio renderer (108) performs gain smoothing operations to calculate or obtain individual sub-frame gains over the ramp (216). For example, these individual sub-frame gains may comprise different gains (or different gain values) such as a sub-frame gain 214 for different sub-frame units such as a sub-frame unit corresponding to a sub-frame time point 210 in the ramp (216).

For object content (e.g., non-channel content, non-bed objects, etc.) represented by one or more dynamic audio objects, the object audio metadata input to the audio renderer (108) may comprise (e.g., encoder sent, bitstream transmitted, etc.) audio metadata parameters specifying (e.g., encoder-sent, bitstream-transmitted, etc.) ramp length(s) along with time varying frame-level gains. Some or all of the ramp length(s) specified by an upstream audio processing device (e.g., 150 of FIG. 1, etc.) may be important for rendering the dynamic audio objects or timing aspects of such rendering. It should be noted that, in some operational scenarios, an encoder that supports cinema applications may not specify ramp length(s) for object content. Additionally, optionally or alternatively, in some operational scenarios, an encoder that supports broadcast applications may (be free to) specify ramp length(s) for channel content.

In some operational scenarios, an encoder-sent ramp length as specified in the audio metadata in an audio bitstream (e.g., 102 of FIG. 1 or FIG. 2A, etc.) for time varying gains may be used and implemented by an audio renderer (e.g., 108 of FIG. 2A, etc.) as described herein.

Figure 3B:
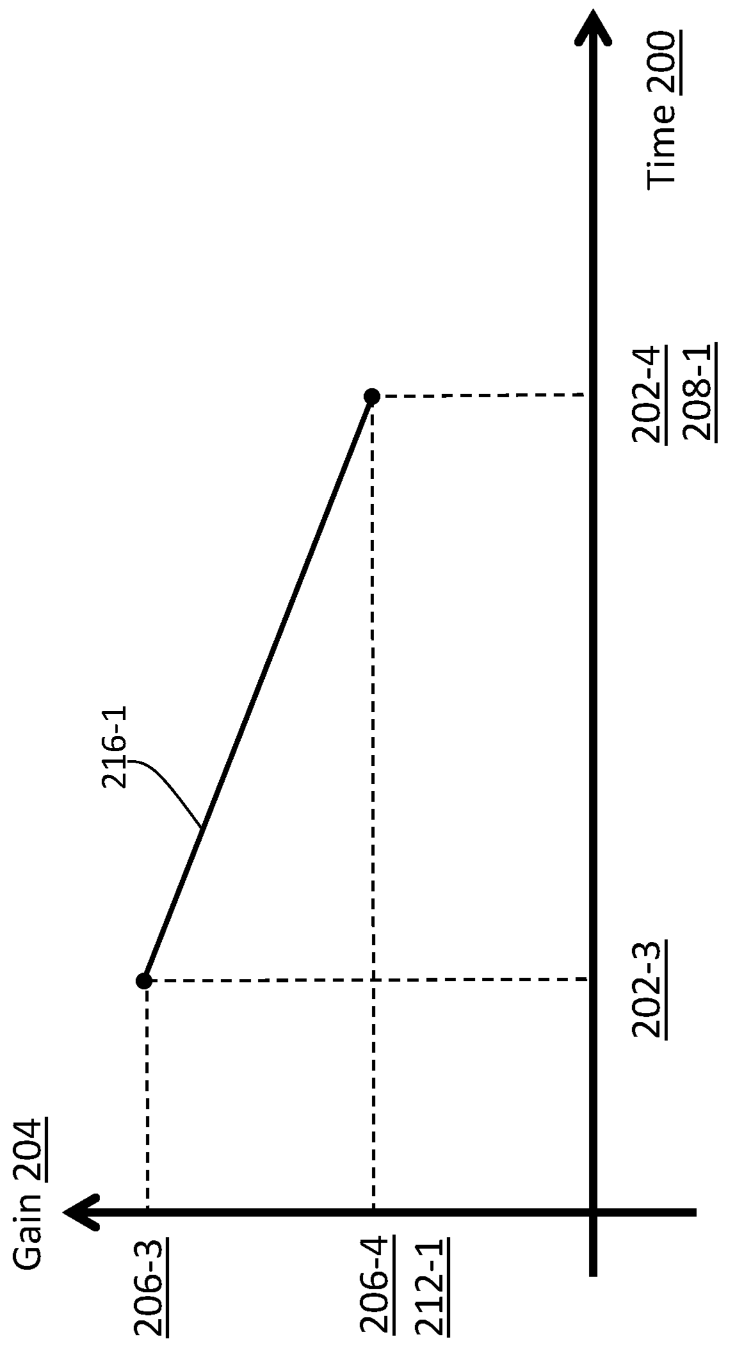

FIG. 3B illustrates example gain smoothing operations with respect to an audio object such as a dynamic audio object in object content. These operations may be at least in part performed by the audio renderer (108).

Frame-level gains for the audio object (e.g. static or dynamic) may be specified in the audio metadata received with the audio bitstream (102). These frame-level gains may comprise a third frame-level gain 206-3 for a third audio frame and a fourth frame-level gain 206-4 for a fourth different audio frame. The third audio frame and the fourth frame may be a part of a sequence of audio frames in the audio bitstream (102). The sequence of audio frames may cover a playback time duration. In an example, the third audio frame and the fourth frame may be two consecutive audio frames in the sequence of audio frames. In another example, the third audio frame and the fourth frame may be two non-consecutive audio frames separated by one or more intervening audio frames in the sequence of audio frames. The third audio frame may comprise a third audio data portion for a third frame time interval starting at a third playback time point 202-3, whereas the fourth audio frame may comprise a fourth audio data portion for a fourth frame time interval starting at a fourth playback time point 202-4.

The audio metadata received in the audio bitstream (102) may specify, or may carry, timing control data such as a ramp length for a ramp 216-1 for applying gain smoothing with respect to the third and fourth frame-level gains (206-3 and 206-4).

The (e.g., encoder-sent, bitstream-transmitted, etc.) ramp length for the ramp (216-1) may be specified in object audio metadata input to the audio renderer (108) as a (gain change/transition) time interval over which the sub-frame gain smoothing operations are to be performed. The ramp length or the time interval for the ramp (216-1) may be input to or used by the audio renderer (108) to determine a final or target time point 208-1 representing the end of the ramp (216-1). Additionally, optionally or alternatively, the audio decoding device (100) may set a final or target gain 212-1 at the end of the ramp (216-1).

In response to receiving the object audio metadata specifying the encoder-sent ramp length, the audio renderer (108) performs gain smoothing operations to calculate or obtain individual sub-frame gains over the ramp (216-1), for example using built-in ramp functionality. These individual sub-frame gains may comprise different gains (or different gain values) for different sub-frame units in the ramp (216-1).

In some operational scenarios, an encoder-sent ramp length is specified in the audio metadata in an audio bitstream (e.g., 102 of FIG. 1 or FIG. 2A, etc.) for time varying gains. A decoder-generated ramp length not specified in the audio metadata in an audio bitstream (e.g., 102 of FIG. 1 or FIG. 2A, etc.) for time varying gains may be generated by modifying the received audio metadata and used or implemented by an audio renderer (e.g., 108 of FIG. 2A, etc.) as described herein.

Figure 3C:
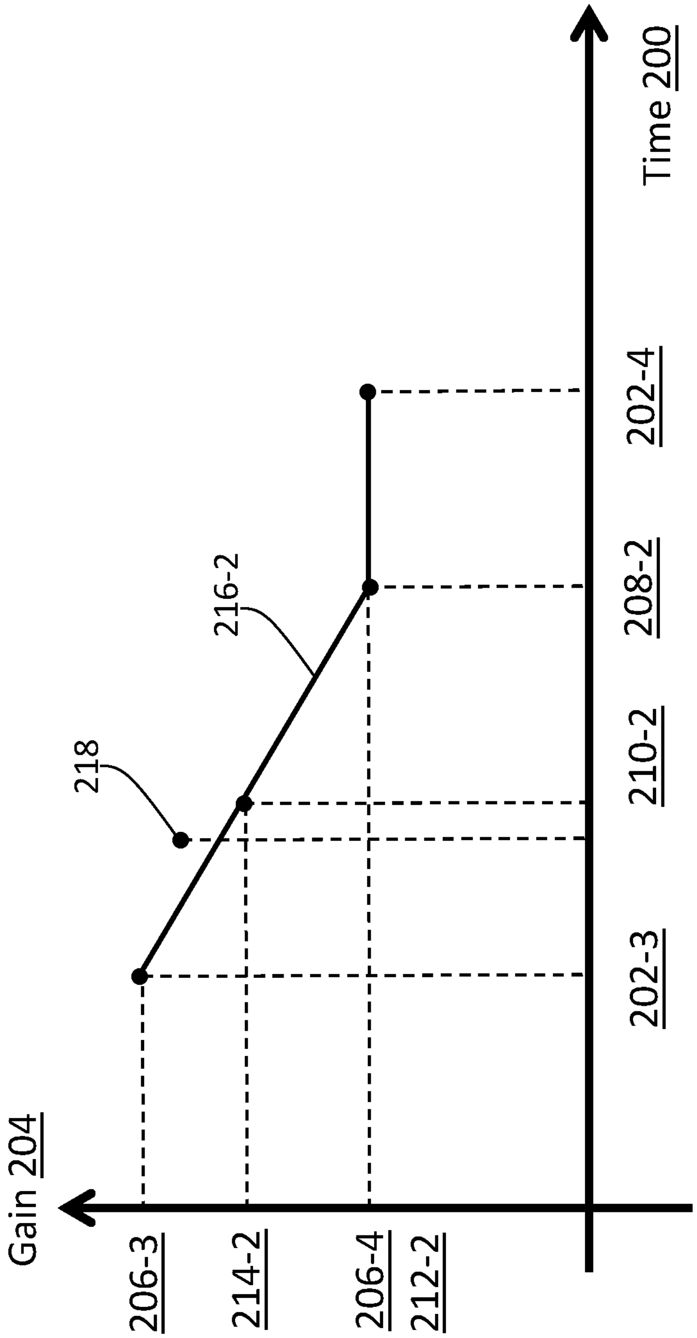

FIG. 3C illustrates example gain smoothing operations with respect to an audio object such as a dynamic audio object as a part of object content. These operations may be at least in part performed by the audio renderer (108).

For the purpose of illustration only, the same frame-level gains as illustrated in FIG. 3B may be specified here in FIG. 3C, for the dynamic audio object in audio metadata received with the audio bitstream (102). These frame-level gains may comprise the third frame-level gain (206-3) for the third audio frame and the fourth frame-level gain (206-4) for the fourth audio frame. The third audio frame may correspond to a frame time interval starting at the third playback time point (202-3), whereas the fourth audio frame may correspond to a frame time interval starting at the fourth playback time point (202-4).

The audio metadata received in the audio bitstream (102) may specify a different (e.g., encoder-sent, bitstream-transmitted, etc.) ramp length for applying gain smoothing with respect to the third and fourth frame-level gains (206-3 and 206-4).

An audio decoding device (100) including and/or operating with the audio renderer (108) may determine (e.g., based on thresholds, based on inequality of the first and second gains, based on additional determination factors, etc.) whether sub-frame gain smoothing operations should be performed with respect to the third and fourth gains. In response to determine that sub-frame gain smoothing operations should be performed with respect to the third and fourth gains, the audio decoding device (100) generates timing control data such as a (decoder-generated) ramp length of a ramp 216-2 for applying the sub-frame gain smoothing with respect to the third and fourth frame-level gains (206-3 and 206-4). Additionally, optionally or alternatively, the audio decoding device (100) may set a final or target gain 212-2 at the end of the ramp (216-2). The final or target gain (212-2) may, but is not limited to, be the same as the fourth frame-level gain (206-4).

The ramp length for the ramp (216-2) may be specified in object audio metadata input to the audio renderer (108) as a (gain change/transition) time interval over which the sub-frame gain smoothing operations are to be performed. The ramp length or the time interval for the ramp (216-2) may be input to or used by the audio renderer (108) to determine a final or target time point 208-2 representing the end of the ramp (216-2). The final or target time point (208-2) for the ramp (216-2) may or may not be the same as the fourth time point (202-4). The final or target time point (208-2) for the ramp (216-2) may or may not be aligned with a frame boundary separating two adjacent audio frames. For example, the final or target time point (208-2) for the ramp (216-2) may be aligned with a sub-frame unit such as a QFM slot or a PCM sample.

In response to receiving the object audio metadata, the audio renderer (108) performs gain smoothing operations to calculate or obtain individual sub-frame gains over the ramp (216-2). For example, these individual sub-frame gains may comprise different gains (or different gain values) such as a sub-frame gain 214-2 for different sub-frame units such as a sub-frame unit corresponding to a sub-frame time point 210-2 in the ramp (216-2).

While the built-in ramp can be leveraged by the audio renderer (108) for audio objects such as dynamic audio objects in object content, simply modifying the ramp length for the purpose of gain smoothing operations such as ducking related gain smoothing might alter audio rendering of these audio objects. Thus, in some operational scenarios, an amount of gain smoothing corresponding to ducking may be achieved by simply integrating ducking related gains such as frame-level gains specified in the audio metadata of the audio bitstream (102) to overall object gains to be applied by the audio renderer (108) to the audio objects—integrated or implemented with sub-frame gains interpolated or smoothened by the audio renderer (108)—used to drive audio speakers in an output audio channel configuration operating with the audio renderer (108) in an audio rendering environment. For audio objects (e.g., in channel content, etc.) without bitstream-transmitted ramp lengths, the audio decoding device (100) can generate ramp lengths to be input to and implemented by the audio renderer (108), as illustrated in FIG. 3A. For audio objects (e.g., in channel content, etc.) with bitstream-transmitted ramp lengths, the audio decoding device (100) can input the transmitted ramp lengths to the audio renderer (108) for performing sub-frame gain smoothing operations.

Timing control data generation and application in connection with gain smoothing operations may take into consideration update rates of both frame-level gains such as ducking and the audio metadata as received by the audio decoding device (100). For example, a ramp length as described herein may be set, generated and/or used based at least in part on the update rates of the gain information and the audio metadata as received by the audio decoding device (100). The ramp length may or may not be optimally determined for an audio object. However, the ramp length may be selected, for example as a sufficiently long time interval, to prevent or reduce the generation of audible artifacts (e.g., "zipper" effect in ducking operations, etc.) in gain change/transition operations.

In some operational scenarios, gain smoothing operations as described herein may or may not be optimal in that it is possible that some intermediate gains (e.g., intermediate ducking gains or values, etc.) may be dropped. For example, an upstream encoder may send more updates in the ramp as determined by the audio decoding device. It may be possible that a ramp is designed or specified with a ramp length longer than times of updates of encoder-sent gains. As illustrated in FIG. 3C, an intermediate (e.g., frame-level, sub-frame-level etc.) gain 218 may be received in the audio bitstream (102) to update a ducking gain of the audio object for an interior time point of the ramp (216-2). This intermediate gain (218) may be dropped in some operational scenarios. The dropping of intermediate gains may or may not alter the perceived quality of the ducking gains applications.

In some operational scenarios, further improvements to sub-frame gain smoothing operations may be implemented in the audio decoding device (100) or the audio renderer (108) therein. For example, the audio decoding device (100) can internally generate intermediate audio metadata such as intermediate OAMD payloads or portions so that all intermediate gain values signaled or received in the audio bitstream (102) are applied by the audio decoding device (100) or the audio renderer (108) therein, resulting in a better gain smoothing curve (e.g., one or more linear segments, etc.). The audio decoding device (100) may generate those internal OAMD payloads or portions in a way that audio objects including but not limited to dynamic audio objects are correctly rendered in accordance with the intent of the content creator of audio content represented by the audio objects.

Figure 3D:
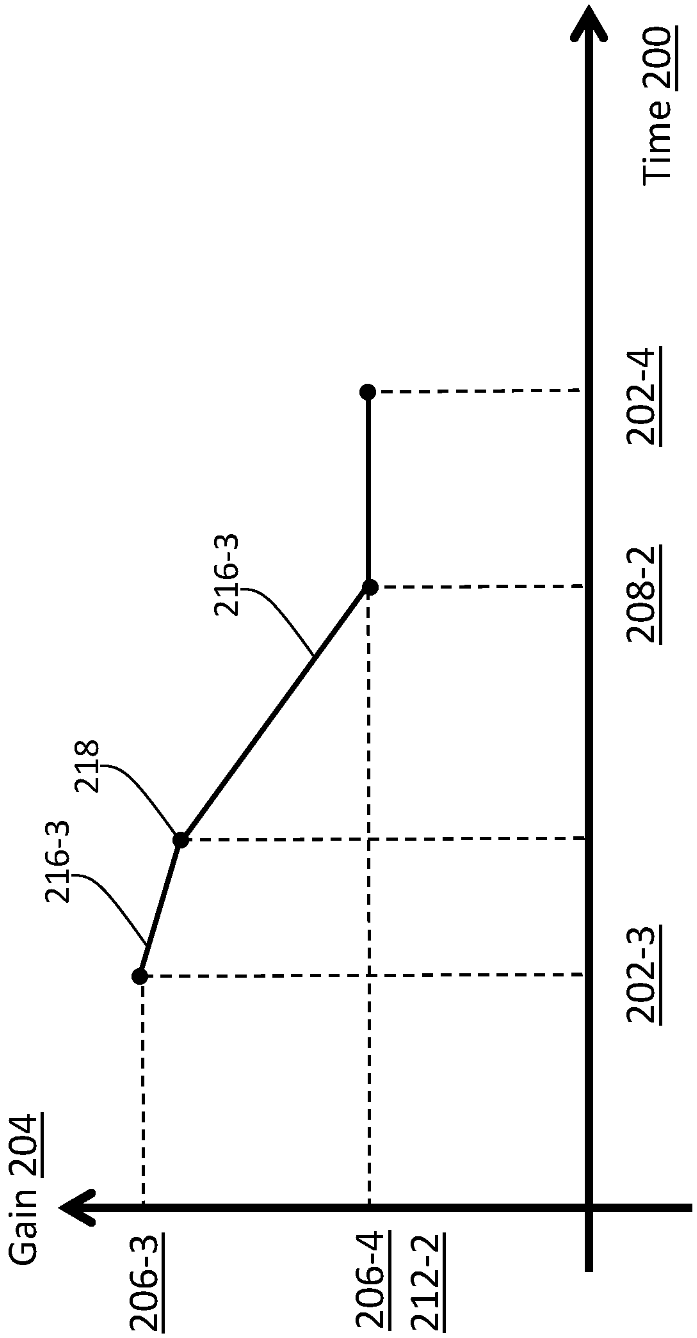

For example, the ramp (216-2) of FIG. 3C may be modified into a different ramp 216-3, as illustrated in FIG. 3D. The ramp (216-3) of FIG. 3D may be set with the same target gain (e.g., 212-2, etc.) and the same ramp length (e.g., between the time points 208-2 and 202-3, etc.) as illustrated in FIG. 3C. However, the ramp (216-3) of FIG. 3D differs from the ramp (216-2) of FIG. 3C in that the intermediate gain (218) received for an interior time point in a time interval covered by the ramp (216-3) is implemented or enforced by the audio decoding device (100) or the audio renderer (108) therein.

Under techniques as described herein, sub-frame gain smoothing on channel content and/or object content in response to time varying gains such as ducking gains may be performed near the end of a media content delivery pipeline, and may be performed by an audio renderer operating with an (actual) output audio channel configuration (e.g., a set of audio speakers, etc.) to generate sound from the channel content and/or object content.

This solution is not limited to any particular audio processing systems such as an AC-4 audio system, but may be applicable to a wide variety of audio processing system in which an audio renderer or the like at or near the end of an audio content delivery and consumption pipeline handles or processes time varying (or time constant) audio objects representing channel audio and/or object audio. Example audio processing systems implementing techniques as described herein may include, but are not necessarily limited to only, those implementing one or more of: Dolby Digital Plus Joint Object Coding (DD+JOC), MPEG-H, etc.

Additionally, optionally or alternatively, some or all techniques as described herein may be implemented in audio processing systems in which an audio renderer operating with an output audio channel configuration is separated from a device that handles user input that can be used to change object or channel properties such as ducking gains to be applied to audio content received in an audio bitstream.

Figure 2B:
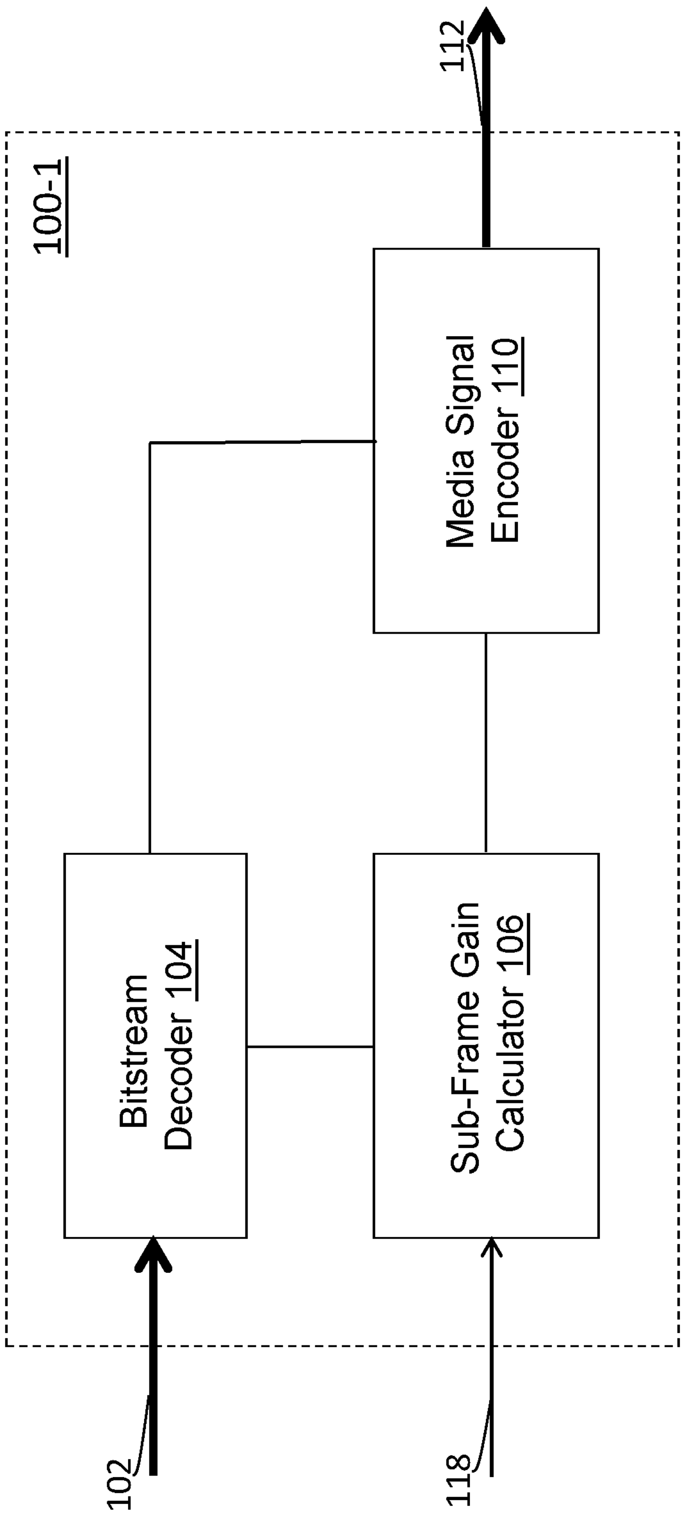
Figure 2C:
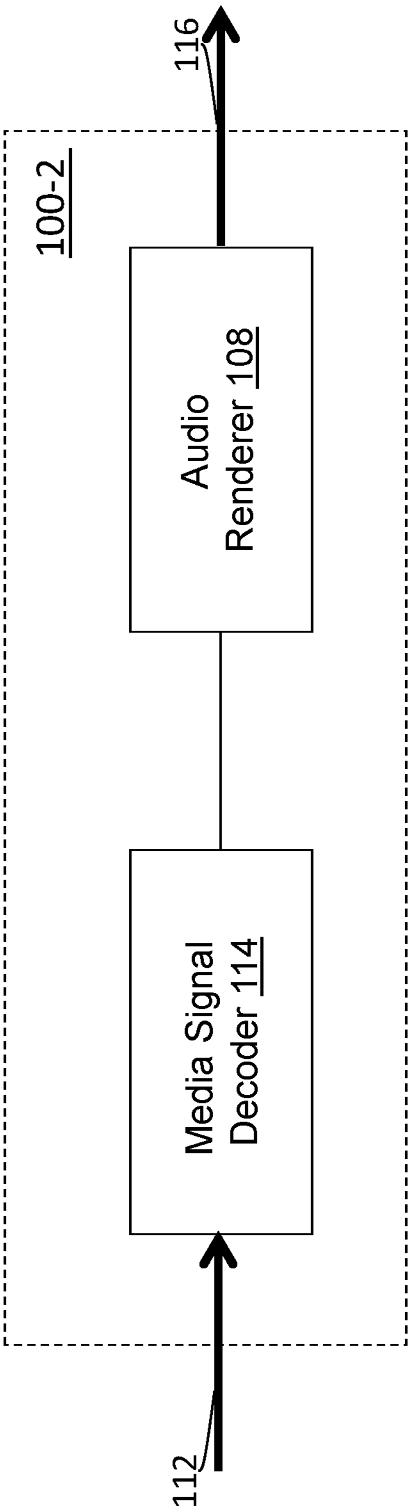

FIG. 2B and FIG. 2C illustrate two example audio processing devices 100-1 and 100-2 that may operate in conjunction with each other to render (or generate corresponding sound from) audio content received from an audio bitstream (e.g., 102, etc.).

In some operational scenarios, the first audio processing device (100-1) may be a set-top box that receives the audio bitstream (102) comprising a set of audio objects and audio metadata for the audio objects. Additionally, optionally or alternatively, the first audio processing device (100-1) may receive user input (e.g., 118, etc.) that can be used to adjust rendering aspects and/or properties of the audio objects. For example, the audio bitstream (102) may comprise a "Main Audio" program and a "Associated Audio" program to which ducking gains specified in the audio metadata are to be applied.

The first audio processing device (100-1) may make adjustments to the audio metadata to generate new or modified audio metadata or OAMD to be input to an audio renderer implemented by the second audio processing device (100-2). The second audio processing device (100-1) may be an audio/video receiver (AVR) that operates with an output audio channel configuration or audio speakers thereof to generate sound from audio data encoded in the audio bitstream (102).

In some operational scenarios, the first audio processing device may perform decoding the audio bitstream (102) and generating sub-frame gains based at least in part on time varying frame-level gains such as ducking gains specified in the audio metadata. The sub-frame gains may be included as a part of the OAMD to be outputted by the first audio processing device (100-1) to the second audio processing device (100-2). The new or modified OAMD generated at least in part by the first audio processing device (100-1) for the audio object and audio data for the audio objects received by the first audio processing device (100-1) may be encoded or included by a media signal encoder 110 in the first audio processing device (100-1) in an output audio/video signal 112 such as a HDMI signal. The A/V signal (112) may be delivered or transmitted (e.g., wirelessly, over a wired connection, etc.) from the first audio processing device (100-1) to the second audio processing device (100-2), for example, via an HDMI connection.

A media signal decoder 114 in the second audio processing device (100-2) receives and decodes the A/V signal (112) into the audio data for the audio objects and the OAMD including the sub-frame gains such as those generated for ducking for the audio objects. and audio data for the audio objects. The audio renderer (108) in the second audio processing device (100-2) uses the input OAMD from the first audio processing device (100-1) to perform audio rendering operations including but not limited to applying the sub-frame gains to the audio object of the audio objects and driving the audio speakers in the output audio channel configuration to generate sound depicting sound sources represented by the audio objects.

For the purpose of illustration only, it has been described that time varying gains may be related to ducking operations. It should be noted that in various embodiments, some or all techniques as described herein can be used to implement or perform sub-frame gain operations related to other audio processing operations other than ducking operations such as audio processing operations related to applying dialogue enhancement gains, downmix gains, etc.

5. Example Process Flows

Figure 4:
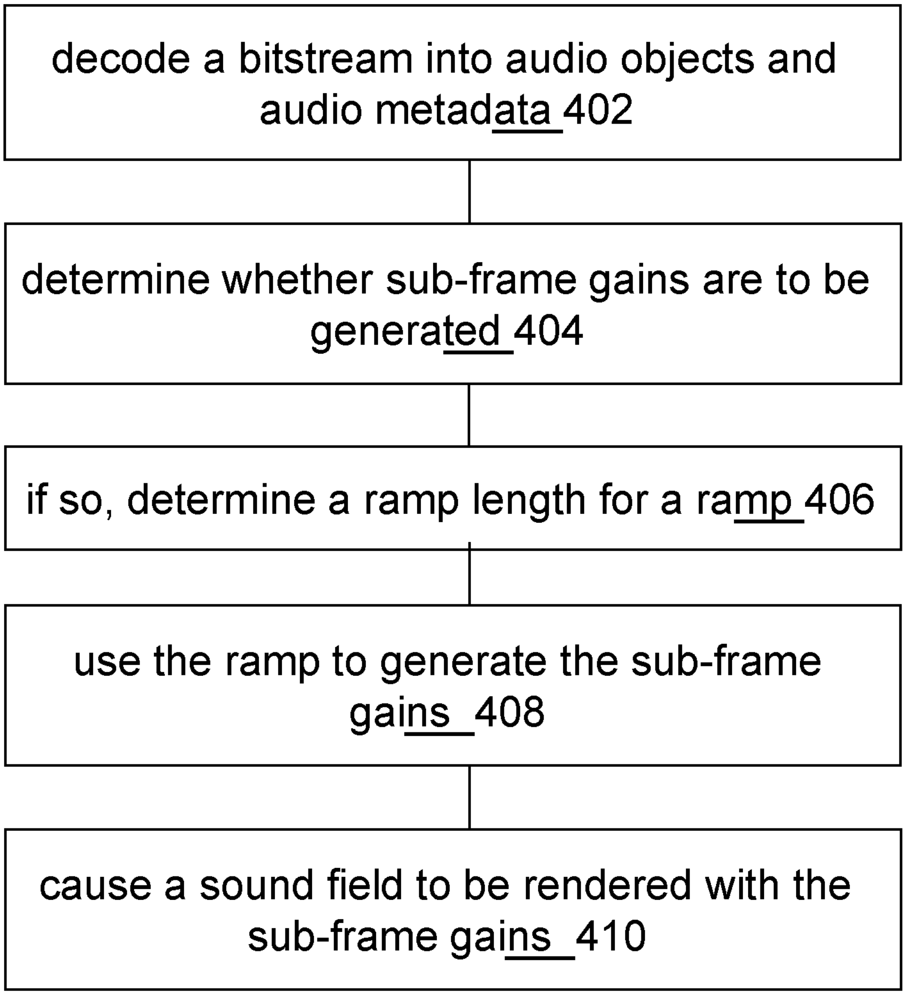
FIG. 4 illustrates an example process flow.

FIG. 4 illustrates an example process flow that may be implemented by an audio decoding device as described herein. In block 402, a downstream audio system such as an audio decoding device (e.g., 100 of FIG. 2A, 100-1 of FIG. 2B and 100-2 of FIG. 2C, etc.) decodes an audio bitstream into a set of one or more audio objects and audio metadata for the set of audio objects. The set of one or more audio objects includes a specific audio object. The audio metadata specifies a first set of frame-level gains that include a first gain and a second gain respectively for a first audio frame and a second audio frame in the audio bitstream.

In block 404, the downstream audio system determines, based at least in part on the first and second gains for the first and second audio frames, whether sub-frame gains are to be generated for the specific audio object.

In block 406, the downstream audio system determines a ramp length for a ramp used to generate the sub-frame gains for the specific audio object, in response to determining, based at least in part on the first and second gains for the first and second audio frames, that sub-frame gains are to be generated for the specific audio object.

In block 408, the downstream audio system uses the ramp of the ramp length to generate a second set of gains, wherein the second set of gains includes the sub-frame gains for the specific audio object.

In block 410, the downstream audio system causes a sound field represented by the set of audio objects, to which the second set of gains is applied, to be rendered by a set of audio speakers operating in a specific playback environment.

In an embodiment, the set of audio objects includes: a first subset of audio objects representing a main audio program; and a second subset of audio objects representing an associated audio program; the specific audio object is included in one of: the first subset of audio objects or the second subset of audio objects.

In an embodiment, the first audio frame and the second audio frame are one of: two consecutive audio frames in the specific audio object, or two-non-consecutive audio frames in the specific audio object that are separated by one or more intervening audio frames in the specific audio object.

In an embodiment, the first gain and the second gain are related to one of: ducking operations, dialog enhancement operations, user-controlled gain transitioning operations, downmixing operations, gain smoothing operations applied to music and effect (M&E), gain smoothing operations applied to dialog, gain smoothing operations applied to M&E and dialog (M&E+dialog), or other gain transitioning operations.

In an embodiment, a built-in ramp used to handle spatial movements of audio objects is reused as the ramp to generate the sub-frame gains for the specific audio object.

In an embodiment, the first audio frame includes a first audio data portion of the specific audio object and the second audio frame includes a second audio data portion of the specific audio object different than the first audio data portion of the specific object.

In an embodiment, the audio metadata is free of a specification of the ramp length.

In an embodiment, the audio metadata specifies an encoder-sent ramp length different from the ramp length.

In an embodiment, the set of gains comprises an intermediate gain corresponding to a time point within a time interval represented by the ramp; the intermediate gain is excluded from the second set of gains to be applied to the set of audio objects in a decoded presentation.

In an embodiment, the set of gains comprises an intermediate gain corresponding to a time point within a time interval represented by the ramp; the intermediate gain is included from the second set of gains to be applied to the set of audio objects in a decoded presentation.

In an embodiment, the set of audio objects comprises a second audio object; wherein an encoder-sent ramp length is specified in the audio metadata received with the audio stream; the encoder-sent ramp length is used as a ramp length for generating sub-frame gains for the second audio object.

In an embodiment, the second set of gains is generated by a first audio processing device; the soundfield is rendered by a second audio processing device.

In an embodiment, the second set of gains is generated by interpolation.

In an embodiment, a non-transitory computer readable storage medium, comprising software instructions, which when executed by one or more processors cause performance of any one of the methods as described herein. Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
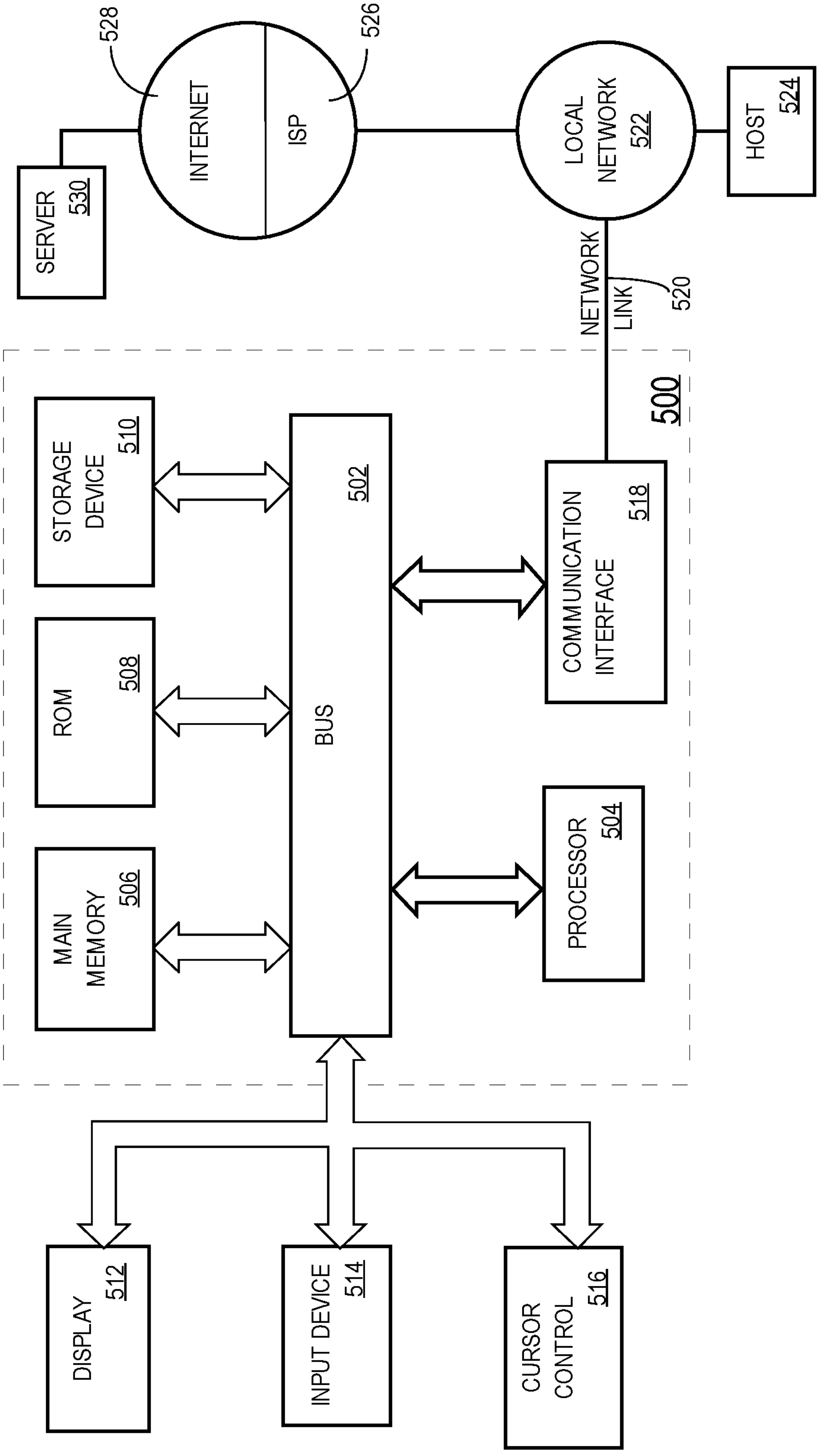
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:

decoding an audio bitstream into a set of one or more audio objects and audio metadata for the set of audio objects, the set of one or more audio objects including a specific audio object, the audio metadata specifying a first set of frame-level gains that include a first gain and a second gain respectively for a first audio frame and a second audio frame in the audio bitstream;

determining, based at least in part on the first and second gains for the first and second audio frames, whether sub-frame gains are to be generated for the specific audio object;

in response to determining, based at least in part on the first and second gains for the first and second audio frames, that sub-frame gains are to be generated for the specific audio object: determining a ramp length for a ramp used to generate the sub-frame gains for the specific audio object;

using the ramp of the ramp length to generate a second set of gains, wherein the second set of gains includes the sub-frame gains for the specific audio object; and causing a sound field represented by the set of audio objects, to which the second set of gains is applied, to be rendered by a set of audio speakers operating in a specific playback environment.

2. The method as recited in claim 1, wherein the set of audio objects includes:

a first subset of audio objects representing a main audio program; and a second subset of audio objects representing an associated audio program; and wherein the specific audio object is included in one of: the first subset of audio objects or the second subset of audio objects.

3. The method as recited in claim 1, wherein the first audio frame and the second audio frame are one of: two consecutive audio frames in the specific audio object, or two-non-consecutive audio frames in the specific audio object that are separated by one or more intervening audio frames in the specific audio object.

4. The method as recited in claim 1, wherein the first gain and the second gain are related to one of: ducking operations, dialog enhancement operations, user-controlled gain transitioning operations, downmixing operations, gain smoothing operations applied to music and effect (M&E), gain smoothing operations applied to dialog, gain smoothing operations applied to M&E and dialog (M&E+dialog), or other gain transitioning operations.

5. The method as recited in claim 1, wherein a built-in ramp used to handle spatial movements of audio objects is reused as the ramp to generate the sub-frame gains for the specific audio object.

6. The method of claim 2, wherein the first gain and the second gain are ducking gains for lowering loudness levels of the first subset of audio objects representing the main audio program relative to the loudness levels of the second subset of audio objects representing the associated audio program, wherein the built-in ramp used to handle spatial movement of audio objects is reused to generate sub-frame ducking gains for the main audio program or the associated audio program, respectively.

7. The method as recited in claim 1, wherein the first audio frame includes a first audio data portion of the specific audio object and the second audio frame includes a second audio data portion of the specific audio object different than the first audio data portion of the specific object.

8. The method as recited in claim 1, wherein the audio metadata is free of a specification of the ramp length.

9. The method as recited in claim 1, wherein the audio metadata specifies an encoder-sent ramp length different from the ramp length.

10. The method as recited in claim 1, wherein the first set of gains comprises an intermediate gain corresponding to a time point within a time interval represented by the ramp; and wherein the intermediate gain is excluded from the second set of gains to be applied to the set of audio objects in a decoded presentation.

11. The method as recited in claim 1, wherein the first set of gains comprises an intermediate gain corresponding to a time point within a time interval represented by the ramp; and wherein the intermediate gain is included from the second set of gains to be applied to the set of audio objects in a decoded presentation.

12. The method as recited in claim 1, wherein the set of audio objects comprises a second audio object; wherein an encoder-sent ramp length is specified in the audio metadata received with the audio stream; and wherein the encoder-sent ramp length is used as a ramp length for generating sub-frame gains for the second audio object.

13. The method as recited in claim 1, wherein the second set of gains is generated by a first audio processing device; and wherein the soundfield is rendered by a second audio processing device.

14. The method as recited in claim 1, wherein the second set of gains is generated by interpolation.

15. The method as recited in claim 1, wherein said determining, based at least in part on the first and second gains for the first and second audio frames, whether sub-frame gains are to be generated for the specific audio object comprises:

determining that sub-frame gains are to be generated for the specific audio object if a difference between the first gain and the second gain exceeds a minimum gain difference threshold; or determining that sub-frame gains are not to be generated for the specific audio object if a difference between the first gain and the second gain does not exceed the minimum gain difference threshold.

16. The method as recited in claim 15, wherein a different minimum gain difference threshold is used for a positive gain change, wherein the second gain value is greater than the first gain, than for a negative gain change, wherein the second gain is smaller than the first gain.

17. The method as recited in claim 1, wherein determining, based at least in part on the first and second gains for the first and second audio frames, whether sub-frame gains are to be generated for the specific audio object comprises:

determining that sub-frame gains are to be generated for the specific audio object if an absolute value of a rate of change between the first gain and the second gain exceeds a minimum gain change rate threshold; or determining that sub-frame gains are not to be generated for the specific audio object if an absolute value of a rate of change between the first gain and the second gain does not exceed the minimum gain change rate threshold.

18. The method as recited in claim 17, wherein a different minimum gain change rate threshold is used for a positive rate of change than for a negative rate of change.

19. An apparatus comprising one or more processors and memory storing one or more programs including instructions, which when executed by the one or more processors, cause the apparatus to perform the method recited in claim 1.

20. A non-transitory computer readable storage medium, comprising software instructions, which when executed by one or more processors cause performance of the method recited in claim 1.

* * * * *